Nov. 15, 1949     V. F. ZAHODIAKIN     2,487,916

FASTENING DEVICE

Filed March 30, 1945

INVENTOR.

VICTOR F. ZAHODIAKIN.

BY

Howard P. King

ATTORNEY

Patented Nov. 15, 1949

2,487,916

UNITED STATES PATENT OFFICE 2,487,916

FASTENING DEVICE

Victor F. Zahodiakin, Short Hills, N. J.

Application March 30, 1945, Serial No. 585,664

2 Claims. (Cl. 24—221)

This invention relates to fastening devices, and more particularly to the stud-and-socket type providing a rotating stud and wherein the stud is separable from the socket. Specifically, the instant invention is an improvement upon my prior Patent 2,262,418 of Nov. 11, 1941.

Many instances occur where it is necessary to secure a plurality of relatively thin members flatwise together with absolute security but at the same time fulfill the requirement of quick release when desired. For instance, a surface section of an airplane may be made removable for access to an interior compartment while the plane is on the ground, but incapable of inadvertent opening at other times. In providing a fastening device for such a use, there must be introduced a minimum of bulk and weight, the exterior of the member must be unobstructed and internal obstruction should not only be a minimum, but of such a character that shifting cargo, meddlesome hands or other controlled or uncontrolled forces from within may not possibly operate to release the fastening means. Vibration has been one prevalent cause of inadvertent release of prior art fastening devices in the use thereof mentioned, coupled with inherent defects of the prior art devices and improper manipulation of those devices by which they have not been properly locked. This last-mentioned contingency has been partly because the operator cannot see the interlocked parts and partly due to over-ambitious effort applied in the locking operation resulting in "over-shooting" the locked position of the parts. A further detriment of the prior art has been due to the bending moment or distorting stresses applied to the members being secured tending to distort the members and to pry the socket portion of the device from its appointed place.

In its most general aspects, therefore, the present invention seeks to overcome the defects and deficiencies of the prior art construction of fastening devices of the character indicated.

Also broadly stated, an object of the invention is to improve upon the prior art fastening devices both as to structure and function.

More specifically, an object of the invention is to provide a fastening device of the rotatable stud type, wherein "overshooting" the locked position is substantially prevented and in any event results in no harm.

Another and highly important object of the invention is to apply the pressure of the resilient member as a compressive force, and not as a torsional force, against the members being clamped.

Yet another object of the invention is to provide a structure which will be compact and which has minimum protrusion beyond the members being secured, and which overlies a minimum area of such members.

A further object of the invention is to provide an improved fastening device having readily manufactured and assembled parts, a device which will be sturdy, readily applied and inexpensive, and a device of few and simple parts.

Still further objects of the invention will appear to those skilled in the art to which it appertains, both by direct recitation thereof and by implication from the context.

Referring to the accompanying drawing in which like numerals of reference indicate similar parts throughout the several views.

Figure 1:
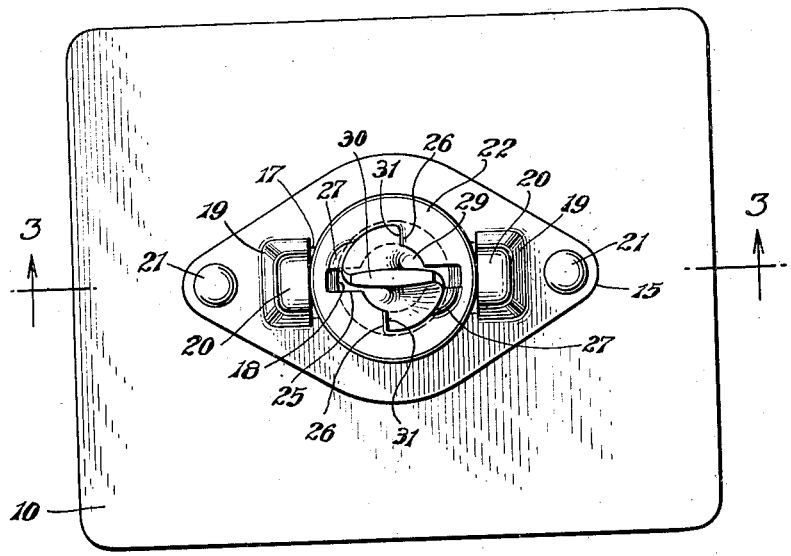
Figure 1 is a plan of my improved fastening device, looking at the same at what may be termed the back side since it is the side away from the operator when locking or unlocking the device.
Figure 2:
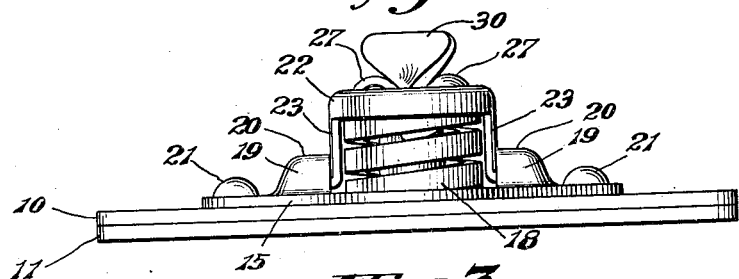
Figure 2 is an edge elevation of the fastening device.
Figure 3:
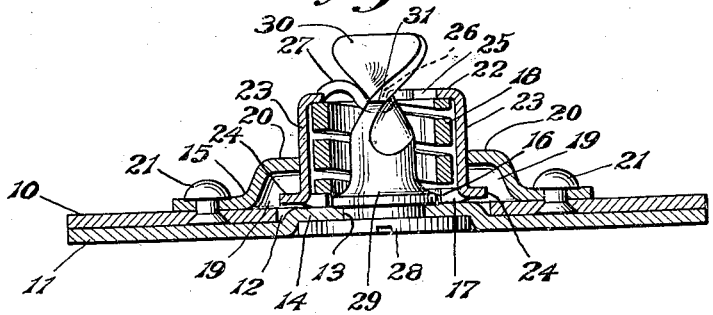
Figure 3 is a longitudinal sectional view on line 3—3 of Fig. 1, both the elevation of Fig. 2 and the section of Fig. 3 being views looking in the direction of the arrows on line 3—3 of Fig. 1.

In the specific embodiment of the invention illustrated in said drawing, the reference numerals 10, 11 designate juxtaposed members adapted to be clamped together in an overlapped flatwise position. For convenience in making distinguishing reference thereto, the members will be referred to as inner member 10 and outer member 11. At the part of said members where the fastening device is to be applied, both members are appropriately punched or otherwise provided with preferably round holes 12, 13 respectively which are arranged to register axially. The hole 12 in the inner member is larger than the hole 13 in the outer member and the outer member is inwardly offset, as at 14, an amount preferably equal to the thickness of the inner member and of diametric size substantially equal to the hole of the inner member so as to seat therein and obtain nested location thereof in the hole 12 and axial registration of the holes.

At the inside face of the inner member 11 and overlying or spanning the hole 12 thereof, is a housing 15, the major portion whereof is a flat plate at the middle of which is a hole or opening 16. The essential requirement of this opening 16 is that it shall freely pass the stud but provide a ledge 17 next the opening to support a spiral spring 18. The diameter of the said opening, therefore, is slightly greater than the hole 13 in outer member 11, but considerably smaller than hole 12 in inner member 10. Said opening 16 while generally circular as above indicated, provides diametrically opposed slot portions in the longitudinal direction of the plate portion of the housing, and at the ends of said slot portions the metal of the plate is drawn outwardly to form undercut pockets 19, the open sides of which face toward each other for purposes hereinafter explained. Said pockets, as an essential part thereof, have transverse or upper wall portions 20 offset from the plane of the housing and functioning both as guides and stops, as likewise will presently appear. The plate portion of housing 15 is shown approximately of diamond shape and the slot portions of the opening 16 and the pockets 19 are preferably on the long axis of the diamond. Beyond the pockets, also shown on the long axis of the diamond shape, the plate is appropriately perforated to receive rivets 21 or the like by which the housing is permanently attached to the inner member 10 with the axis of hole 12 therein coinciding with the axis of the circular part of opening 16 of the housing.

At the remote end of spiral spring 18 from the plate-engaging end, is an inverted cup 22 as one example of a retainer for the spring and engaging means for the stud. The skirt portion of the cup depends at the end of the spring to prevent sideslip of the spring from the retainer but said skirt is adequately spaced from the housing pockets so as to be depressed without interference therefrom. However, from said skirt portion of the retainer two diametrically opposite legs 23 depend past and in sliding engagement with the aforementioned transverse or upper wall portions 20 of the pockets, said legs having outwardly bent lugs or feet 24 at their lower ends, which project into the pockets and will limit outward movement of the retainer and expansion of the spring. By virtue of the projection of the said feet or lugs 24 in the pockets, the retainer is likewise prevented from rotation but is permitted to slide or move axially within the range established by the offset distance of the pocket wall 20. The spring is preferably under a degree of compression when expanded to the limit permitted by the pockets, and of course is under greater compressive strain when the retainer is depressed below the said limiting position.

The transverse portion of the retainer from which the skirt depends, has a blade-receiving slot 25 therein, and at 90° rotative displacement has hollows or depressions 26 for receiving and retaining stud shoulders subsequently identified herein. Diametrically opposite stops or projections 27 are provided in one rotative direction between said slot and depressions, utility whereof will presently appear.

It may be here pointed out that the housing 15, spring 18 and retainer 22 are assembled as a unit, constituting what may be generically termed the socket member. The structure of this socket member is very compact and neither requires much area on nor unseemly projection from the member 10 on which ultimately applied for use.

Within and substantially filling the depression formed in outer member 11 due to the circular offset 14, is a head 28 of a stud 29. The outer face of said head 28 is preferably in the plane of the outer face of the member 11. Behind and coaxial with the head, the stud provides a shank which passes through the hole 13 of member 11, the metal of the shank being burred or upset or otherwise rendered of sufficiently greater diameter than the said hole to retain the stud rotatively mounted in said member. Accordingly, when the members are assembled in position to be clamped, the stud will project through the inner member and through the socket member. In such assembled position, the stud extends coaxially through the spring, and is provided at its inner end with a blade 30 of appropriate dimensions to enter and project from the slot 25 of the retainer. Preferably, said blade is formed as a steep helix whereby, after initial insertion in the slot, continued rotation will have screw action on the retainer and depress said retainer against the spring tension. Below the end of the blade, the same is undercut to provide transverse shoulders 31 at a common planar distance from the head, and ultimately these shoulders ride out of the retainer slot and over the flat land portion of the retainer intervening, in rotative direction, between the said slot and said depressions 26 above referred to. The retainer then may snap outwardly seating the shoulders in the depressions. Further rotation of the stud in the forwardly direction is then positively prevented by presence of the aforementioned stops 27. This prevents "overshooting" the locked position.

Attention is called to the fact that the compressive force of the spring reacts at the inner end through the retainer with a moment of force longitudinal of the stud and against the shoulders provided upon the stud. The moment of force exerted in the opposite direction is against the ledge 17 of the housing which in turn is then engaging against the offset portion 14 of the outer member 11 under which is positioned the head of the stud. Housing 15 consequently is under no strain from the spring pressure and therefore introduces no disruptive force upon the rivets mounting it in place. This construction thus adds greatly to the security and permanence of the fastening device.

I claim:

1. A fastening device for juxtaposed members comprising a socket structure constructed and arranged to receive and releasably interlock with a rotatable stud; said socket structure comprising a housing, spring and retainer; said housing comprising a basal portion having an opening for projection of said stud therethrough, and having pockets directed toward and terminating next said opening, said pockets being formed by walls integral at the sides of each with and bulging from the basal portion of said housing, and said housing having a ledge next said opening for receiving an end of said spring thereon; said spring comprising a longitudinal coil substantially coaxial to said opening and having one end seated on said ledge; and said retainer comprising a transverse wall seating on the end of the spring opposite said ledge, and said retainer having legs extending longitudinally of and at the outside of said spring toward said housing and in part between said spring and the inwardly directed ends of said bulging pocket forming walls, whereby said spring prevents said legs from bending inwardly and said inwardly directed pocket forming wall ends prevent said legs from bending outwardly, and feet on the ends of said legs projecting away from the spring and into said pockets.

2. A fastening device for juxtaposed members comprising a socket structure constructed and arranged to receive and releasably interlock with a rotatable stud having a steep helical blade; said socket structure comprising a housing, spring and retainer; said housing comprising a flat basal portion having an opening for projection of said stud therethrough, and having diametrically opposite pockets directed toward and terminating next said opening, said pockets being formed by walls integral at three sides of each with and bulging from the flat basal portion of said housing, and said housing having a ledge next said opening for receiving an end of said spring thereon; said spring comprising a longitudinal coil substantially coaxial to said opening and having one end seated on said ledge; and said retainer comprising an inverted cup with its transverse wall having a stud-receiving slot therein and said transverse wall seating on the end of the spring opposite said ledge, and said retainer having legs extending longitudinally of and at the outside of said spring toward said housing and in part between said spring and the inwardly directed ends of said bulging pocket forming walls, whereby said spring prevents said legs from bending inwardly and said inwardly directed pocket forming wall ends prevent said legs from bending outwardly, and feet on the ends of said legs projecting diametrically away from the spring and into said pockets.

VICTOR F. ZAHODIAKIN.

REFERENCES CITED

The following references are of record in the file of this patent:

UNITED STATES PATENTS

| Number | Name | Date |
|---|---|---|
| 1,897,836 | Bristol | Feb. 14, 1933 |
| 2,152,231 | Yaneson | Mar. 28, 1939 |
| 2,279,343 | Reeser | Apr. 14, 1942 |
| 2,307,132 | Hufferd | Jan. 5, 1943 |
| 2,339,591 | Weber | Jan. 18, 1944 |
| 2,380,131 | Venditty | July 10, 1945 |